United States Patent [19]
Fentress et al.

[11] 3,888,917
[45] June 10, 1975

[54] ORGANIC SULFONATE EXTRACTION PROCESS

[75] Inventors: Denton C. Fentress, Littleton; Kent W. Robinson, Englewood, both of Colo.

[73] Assignee: Marathon Oil Company, Findlay, Ohio

[22] Filed: May 6, 1971

[21] Appl. No.: 141,032

Related U.S. Application Data

[63] Continuation-in-part of Ser. No. 763,185, Sept. 27, 1968, abandoned.

[52] U.S. Cl........ 260/504 R; 260/513 B; 260/505 P
[51] Int. Cl........................................... C07c 139/00
[58] Field of Search.......... 260/504 R, 504 S, 513 B

[56] References Cited
UNITED STATES PATENTS

| | | | |
|---|---|---|---|
| 2,280,118 | 4/1942 | Dombrow | 260/400 |
| 2,673,208 | 3/1954 | Andrews et al. | 260/400 |
| 3,424,770 | 1/1969 | Stein | 260/400 |

*Primary Examiner*—Leon Zitver
*Assistant Examiner*—A. Siege
*Attorney, Agent, or Firm*—Joseph C. Herring; Richard C. Willson, Jr.; Jack L. Hummel

[57] ABSTRACT

A process for extracting organic sulfonates useful as highly biodegradable detergents from an aqueous reaction mixture comprised of organic sulfonates, water, unreacted organic starting material, sulfonating agents, alcohol solvent, and by-products from the sulfonation of the organic hydrocarbons, the process comprising contacting the reaction mixture with a water soluble ketone containing 3–6 carbon atoms to precipitate the organic sulfonates from the mixture, then separating the precipitated organic sulfonates from the aqueous mixture by conventional methods, e.g. filtration, and thereafter drying the sulfonates. The filtrate from the precipitation step is preferably sent to a distillation column where the water soluble ketone is separated from the other components of the mixture to be recycled to the precipitation step. The remaining components of the mixture are also recycled to the reactor for sulfonation, to complete the continuous process.

15 Claims, 1 Drawing Figure

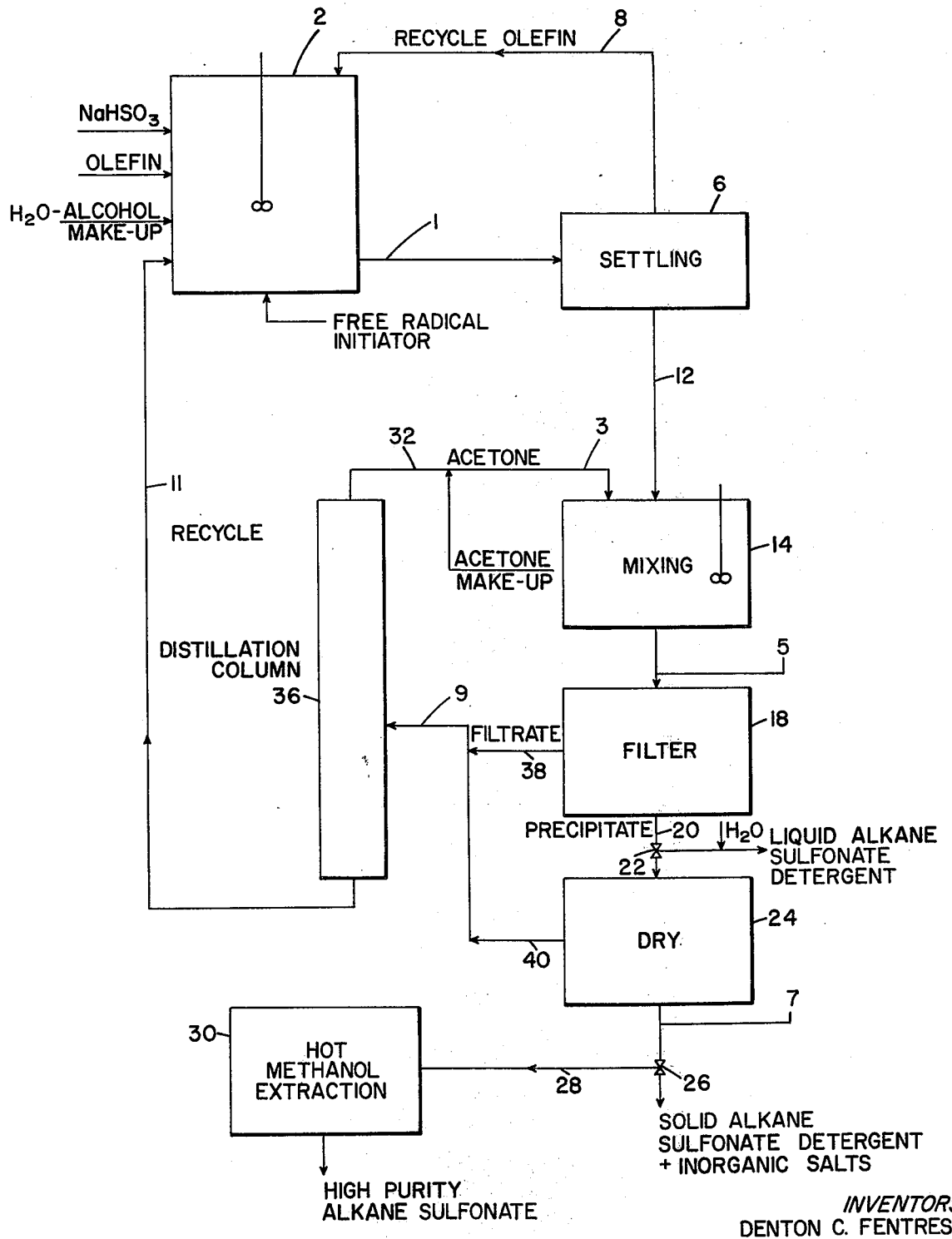

ORGANIC SULFONATE EXTRACTION PROCESS

CROSS-REFERENCE TO RELATED APPLICATIONS

This application is a continuation-in-part of our copending application, Ser. No. 763,185, filed Sept. 27, 1968, now abandoned.

BACKGROUND OF THE INVENTION

Field of the Invention.

The field of this invention relates to the production of organic sulfonates and to separation of the organic sulfonates from product mixtures containing the same.

DESCRIPTION OF THE PRIOR ART

Much work has been done in the search for commercially economical processes for the production of organic sulfonates by reaction of unsaturated hydrocarbons with inorganic bisulfites. Such a process is especially desirable because of the high marketability of the products and the relatively low cost of the individual raw materials Previous work has been patented in the United States as, for example, in U.S. Pat. Nos. 3,168,555, 3,150,169, 3,084,186, 2,504,411, and 2,318,031, and abroad as for example in British Patent No. 995,376. To our knowledge, however, none of these processes or like processes for the production of organic sulfonates by reaction of hydrocarbons with inorganic bisulfites has proved to be practical on a commercial scale.

Processes for preparing organic sulfonates by bisulfite addition to unsaturated hydrocarbons present the problem of separating the desired organic sulfonate compounds from the reaction mixtures containing the same. Methods used heretofore have often involved a multiplicity of steps, or have required use of special separation procedures and apparatuses. One common process involves evaporation of the water and solvent, deoiling by extraction with a light hydrocarbon, e.g. pentane, and distillation of the light hydrocarbon for recycle. Purity of the organic sulfonates has often been below the requirements needed for certain detergent formulations.

SUMMARY OF THE INVENTION

It has been discovered that organic sulfonates and inorganic salts in aqueous reaction mixtures comprising organic sulfonates (containing 6–30 carbon atoms), unreacted organic starting material, water, and possibly other reactants such as bisulfite salts, and alcohol solvent, can be separated by contacting the reaction mixture with a water-soluble ketone (3–6 carbon atoms) to cause the organic sulfonates and inorganic salts to precipitate. The precipitate is conventionally filtered and dried to produce a solid detergent comprising from 80 to 100 weight percent organic sulfonates and from 0 to 20 weight percent inorganic salts.

The process is preferably applied to the precipitation of organic sulfonates from a product mixture supplied by the reaction of a suitable organic unsaturated hydrocarbon with bisulfite ion in the presence of a suitable solvent, such as a lower alcohol, i.e. containing 1 to about 6 carbon atoms, and a free radical initiator, such as air. Upon addition of the water-soluble ketone (contains 3 to about 6 carbon atoms), organic sulfonates and sulfate salt are precipitated. Thereafter, the precipitate can be separated and dried to give an excellent detergent composition. The filtrate is preferably sent to a distillation column where the ketone is stripped off and sent back to the precipitation step, and the other components, including unreacted bisulfite, unreacted organic hydrocarbon, alcohol solvent, water, some inorganic salts, and minor amounts of unprecipitated organic sulfonate which is present in the filtrate are recycled to the bisulfite-organic hydrocarbon reactor to be re-utilized.

The process is carried out using conventional apparatus and provides for recycling steps for an essentially closed step process with complete utilization of material. The products of this invention may be used directly as detergents or may have incorporated therein conventional builders or other additives as desired to produce detergents of a highly biodegradable and low foam nature. For instance, when terminal olefins of carbon number $C_{12}$ to $C_{14}$ are utilized as reactants in this invention, a high quality shampoo detergent is formed. These and other uses are well known to those skilled in the art.

BRIEF DESCRIPTION OF THE DRAWING

The accompanying FIGURE illustrates a preferred embodiment of the invention.

DESCRIPTION OF THE PREFERRED EMBODIMENTS

Although our process is broadly applicable to precipitating organic sulfonates from aqueous mixtures comprising organic sulfonates, water, and unreacted organic hydrocarbon, it is preferably applicable, as hereinafter will be more fully described, to mixtures comprising lower molecular weight alcohols (contain 1 to about 6 carbon atoms), sulfonating agents, and other by-products from the sulfonation reaction with the organic unsaturated hydrocarbons.

Into reactor 2 are charged starting materials consisting of bisulfite, unsaturated organic hydrocarbons, and a lower molecular weight alkanol (i.e., contains 1 to about 6 carbon atoms) in the presence of a free radical initiator. In addition to these reactants, there may be present catalysts to promote the reaction, and pH controlling agent, such as a monitored caustic or acid addition system or preferably, an added buffer compound which effectively controls the pH without use of monitoring methods.

The hydrocarbons useful in the invention must contain unsaturations, either triple or more preferably double bonds. In general, acyclic olefins especially those having about 6 to about 30 carbon atoms and most particularly those with are straight-chain are preferred for the process of the present invention, although cyclic compounds such as dodecyl benzene may be employed. While polyenes may be utilized, mono-unsaturated compounds are preferred. The most preferred hydrocarbons are the alpha (that is, terminal) olefins, especially the normal alpha-olefins containing about 6 to about 30 and more preferably about 10 to about 22 carbon atoms. Mixtures of the above hydrocarbons may be utilized, and it is a special feature of the present invention that it is relatively insensitive to the molecular weight or chain length of the hydrocarbon raw materials. That is, it permits the sulfonation of each of the various component hydrocarbon mixtures to substantially the same degree.

If desired, the hydrocarbons may be preaerated to a desirable peroxide number. Normally the reaction will be enhanced by utilization of preaerated hydrocarbons. The peroxide numbers are determined by the standard titration procedures Hercules Methods I and III.

Commercially pure hydrocarbons will, in general, be suitable for the process of the invention but contamination by compounds having labile hydrogens (and thus capable of forming relatively stable free radicals), e.g. compounds containing dialyllically activated carbon-hydrogen bonds, should preferably be avoided. Such materials may be removed from reaction mixtures with acid treatment or by adsorption with alumina, silica gel, or other solid adsorbent.

Sodium bisulfite is the most preferred source of bisulfite ions. However, any non-interferring compound which forms bisulfite ions in the reaction mixture 2 may be utilized. Additional useful cations include alkali metals such as potassium, lithium, rubidium, can cesium, as well as ammonium. In addition to bisulfite, non-interferring pyrosulfites and metabisulfites may be used as may other compounds which produce bisulfites in situ under the conditions of the reaction. Preferably from about 0.1 to about 10 and more preferably from 0.5 to about 5 moles of bisulfite are utilized per mole of unsaturation in the unsaturated hydrocarbons. In our process, under most conditions and with most starting materials, nearly stoichiometric proportions of bisulfites can be employed with excellent yields. This is a very practical economic advantage.

The bisulfite addition reaction is conducted in the presence of a solvent which is substantially non-reactive with the starting materials and the end products. Preferred solvents are low molecular weight alcohols (containing 1 to about 6 carbon atoms and preferably 1 to about 3 carbon atoms, e.g. methanol, ethanol, and isopropyl alcohol because of their good solubilizable properties, ready availability, and convenient recovery. From about 0.25 to about 10 volumes of solvent will generally be utilized per volume of unsaturated hydrocarbon reactant, and about 1:1 is the most preferred volume ratio.

Some water is generally added to the reaction mixture to at least partially solubilize the sodium bisulfite within the reaction mixture. However, the reaction proceeds slowly unless approximately 20 percent or more of the above-mentioned organic solvents are added to make a cosolvent system. This seems to be necessary since the hydrocarbons are generally only partially soluble in the water whereas in the cosolvent system, they are substantially completely soluble. The most preferred reaction mixture will contain about 1 to about 75 percent by volume water together with one of the above-mentioned organic solvents, most preferably isopropyl alcohol.

The reaction is generally enhanced by adding a surfactant in the amount of from about 0.1 to about 5 percent by weight of the reaction mixture. This surfactant is preferably the organic sulfonate product of this reaction, although a wide variety of cationic, nonionic, and anionic surfactants may be employed.

The reaction is carried out in the presence of a free radical initiator, such as peroxides; tertiary peroxides such as tert-butyl peroxide, cumene hydroperoxide, and other free radical initiating agents such as azobisiobutyronitrile; and more preferably oxygen-containing gases such as air wherein at least 2 percent and more preferably 20 percent or more of the gas contains free oxygen. During the reaction, the air is preferably bubbled up through the reaction mixture to give highest conversions of the olefin starting material to the organic sulfonate detergent product.

The temperature during the bisulfite-addition reaction is not narrowly critical but must be above the freezing point and below the point at which the solvent loss will become excessive or at which the reactants or products will undergo thermal decomposition. In general, temperatures of about 15° to about 200°C are preferred with temperatures of about 50° to 100°C and temperatures of about 60 to about 80°C being most preferred. Pressure during the bisulfite addition is also not narrowly critical and may be about 0.1 to about 10,000 psia with pressures of about 10 to about 100 psia being most preferred. The optimum pressure will in most instances be atmospheric or slightly higher.

Although when using the proper ratios of starting materials and preferred pH control there will be little unreacted oil (unsaturated hydrocarbons starting material), in general there will be up to about 1 to 20 weight percent unreacted oil in the reaction mixture. Other components in the reaction mixture include reacted bisulfite ion, water, alcohol, by-product salt such as sodium sulfate and sodium bisulfate, and the desired product organic sulfonate. When the preferred alpha-olefin starting materials are utilized, the desired detergent product will be an alkane sulfonate as designated in the drawing. The reaction mixture from reactor 2 is delivered via 1 to settling tank 6 where a portion of the unreacted olefin separates upon standing and may be skimmed off or decanted and recycled via 8 to reactor 2.

The partially de-oiled mixture from the settling step 6 is conveyed to mixing zone 14 through conduit 12. This mixture will comprise in general about 5 to about 50 weight percent alcohol, about 5 to about 50 weight percent water, about 0.5 to about 20 weight percent unreacted olefin, about 0.1 to about 10 percent sodium bisulfite, about 1 to about 20 weight percent sodium sulfate, and about 20 to about 90 weight percent alkane sulfonate.

The exact composition of this mixture will vary according to the amounts and ratios of starting materials charged to reactor 2 as well as the conversions obtained.

We have found in accordance with this invention that this reaction mixture can be de-oiled and the desired detergent product separated by first adding preferably about 10 to about 10,000 and more preferably about 100 to about 500 percent by volume, based on the effluent from stream 12, of a substantially water-soluble ketone containing 3 to about 6 carbon atoms to the mixture in mixing zone 14. The water soluble ketone acts as an anti-solvent in selectively precipitating on the basis of solubility the alkane sulfonate and any inorganic salts (e.g. sodium sulfate) present in the mixture. The apparatus for mixing may be a tank, open or closed, with a motor driven stirrer, or any other conventional mixing apparatus. Alternatively, the mixing step could be performed in a column, where the falling precipitated alkane sulfonate will contact, successively, a liquid richer in acetone or other suitable water-soluble ketone and more thoroughly remove the alcohol, water, and unreacted olefins from the alkane sulfonate and sodium sulfates.

The water-soluble ketones contain 3 to about 6 carbon atoms, examples of alkanones include acetone, methyl ethyl ketone, ethyl ethyl ketone, methyl propyl ketone, ethyl propyl ketone, etc. Mixtures of the ketones are useful. Acetone is most preferred because of its solubility range, ready availability, and because of the ease in which it may be recovered and recycled to the mixing zone 14.

The mixture is conveyed via conduit 5 to filtration step 18. Since the process is preferably carried out in a continuous manner, a continuous solid discharge filter is preferred. Suitable filters may be of the rotary drum pressure type or rotary drum vacuum type. The filtrate contains alcohol, water, unreacted olefin, and about 0.2 to about 2 weight percent alkane sulfonates which do not precipitate in the filtration step along with some unreacted sodium bisulfite and sodium sulfate. This filtrate mixture is sent through conduit 38 to be eventually recycled. The precipitate from the filtration step may be conveyed through conduit 20 and two-way valve 22 where water can be added to give a suitable liquid alkane sulfonate detergent. However, for most purposes, the precipitate is sent to drying step 24 where the precipitate may be water separated and then dried at about 100° to about 300°F at atmospheric pressure, preferably, to prevent discoloration and to drive off any remaining acetone and water which is conveyed in conduit 40 for recycle.

The solid alkane sulfonate product from drying step 24 contains about 20 to about 90 weight percent solid alkane sulfonate with the remainder being inorganic salt builders, principally sodium sulfate. Alternately, two-way valve 26 may be switched to direct the alkane sulfonate and inorganic salts to a hot methanol extraction step 30 for final separation to produce high purity alkane sulfonates, that is, where the final composition contains greater than about 98 percent alkane sulfonate.

The acetone and water condensate from the drying step are combined with the filtrate from the filtering step and together conveyed to distillation column 36. The column is heated to a temperature sufficient to fractionally distill the acetone as overhead vapors to be recycled in conduit 32 in mixing vessel 14. The distillation bottoms are comprised of alcohol, water, unreacted olefin, along with some unreacted sodium bisulfite, sodium sulfate and alkane sulfonate with is all recycled via 11 to reactor 2.

More than one distillation column may be necessary if a ketone is employed which boils at a higher temperature than the alcohol. The embodiment shown in the FIGURE is applicable for the preferred alcohol, i.e. isopropyl alcohol, which boils at a substantially lower temperature than acetone. Thus, if a water-soluble ketone is employed which has a boiling point in the range intermediate between water and the alcohol used, the first distillation column would fractionally distill the alcohol and a second distillation would be necessary to fractionally distill the water-soluble ketone. The alcohol would be recycled to reactor 2 and the ketone to mixing zone 14. Other variations of this type will be obvious to one skilled in elementary refining operations.

The temperature during the mixing step is preferably carried out at above 0° to about 150°F., although ambient temperatures are more preferably employed as temperature has not been found to be narrowly critical. Pressure is also not narrowly critical at this step with pressures ranging from 0 to 10,000 psia preferred with ambient pressure more preferred. These temperature and pressure requirements similarly extend to the filtering step. Thus a pressure continuous discharge filter may be employed. The temperature during the drying step is preferably about 100° to about 300°F and more preferably about 150° to about 200°F with pressures ranging preferably about 5 to about 30 psia although it is more preferred to operate under ambient pressure conditions for economical reasons. The temperatures and pressures employed in distilling the ketone will preferably be about 100° to about 300°F at about 5 to about 50 psia, and more preferably about 150° to about 250°F at about 10 to about 20 psia although in general these values will be determined with respect to the particular mixture influent to the distillation column.

While this invention has been described on a continuous basis, the process for extracting organic sulfonates from mixtures containing the same along with unreacted oil, water, and various salts, etc. may be practiced on a batch basis.

The fllowing example is merely illustrative of a preferred embodiment of this invention and should not be construed to limit it in any way.

EXAMPLE $C_{15}$—$C_{18}$ preaerated α-olefins (obtained from Chevron Oil Co.) are continuously fed to a 10 gallon Pfaudler glass-lined reactor at a feed rate of 2.93 lb/hr. To these preaerated olefins, which have attained a peroxide number of 423 according to Hercules Method No. I and a period number of 1089 according to Hercules Method No. III, is added sodium bisulfite at a rate of 2.32 lb/hr along with a recycling solvent [solution of IPA (isopropanol) and water] stream at a rate of 11.94 lb/hr. The reaction level is held to 8 gallons with a pumping rate such that there is an average contact time of 4 hours. The vapor phase in the reactor is controlled at 2 to 5 percent by volume of oxygen by a chromatographic analysis-control system. The reflux temperature is held at 167°F. and the reactor is fitted with a reflux condenser. The reaction converts 75 percent of the olefin to sulfonate product. The reaction product (stream No. 1 of the accompanying FIGURE) is cooled to 72°–100°F., allowed to settle, and contacted with a 90 percent aqueous acetone stream in the ratio of 1.16:1 of stream No. 3 to Stream No. 12 by weight. This causes 89 percent of the sulfonate and virtually all of the $Na_2SO_4$ salt to precipitate. The solids are then filtered and dried. The combined filtrate and drying condensate is fed to a continuous distillation column where the acetone is concentrated in the overheads and the IPA-water reaction solvent and the unreacted olefins are concentrated in the bottoms product. Both streams are recycled. Only small amounts of acetone, IPA and $H_2O$ are required as make-up. With the recycling of the olefins, the overall olefin conversion to sulfonate is 98.3 percent by weight.

Table I gives the compositions of the various streams referred to in the FIGURE:

TABLE I

STREAM COMPOSITIONS LBS/HR

| Stream No. | Olefin | NaHSO₃ | RSO₃Na | IPA | H₂O | Acetone | Total |
|---|---|---|---|---|---|---|---|
| 1 | 0.96 | 1.02 | 4.69 | 4.63 | 5.89 | 0 | 17.19 |
| 3 | 0 | 0 | 0 | 1.50 | 0.50 | 18.00 | 20.0 |
| 5 | 0.96 | 1.02 | 4.69 | 6.13 | 6.39 | 18.00 | 37.19 |
| 7 | 0.05 | 1.02 | 4.18 | 0 | 0.05 | 0 | 5.30 |
| 9 | 0.91 | 0 | 0.51 | 6.13 | 6.34 | 18.00 | 31.94 |
| 11 | 0.91 | 0 | 0.51 | 4.63 | 5.89 | 0 | 11.94 |

It should be understood that the invention is capable of a variety of modifications and variations which will be made apparent to those skilled in the art by a reading of the specification and which are to be included within the spirit of the specification and claims appended hereto.

What is claimed is:

1. A process of recovering alkane sulfonates containing about 6 to about 30 carbon atoms per molecule from an aqueous reaction mixture comprised of said alkane, alkanols containing 1-6 carbon atoms sulfonates, water, unsaturaged hydrocarbons containing about 6 to about 30 carbon atoms, sulfonating agents selected from the group consisting of alkali metal and ammonium bisulfites, pyrosulfites and metabisulfites, and by-products from sulfonating the unsaturated hydrocarbons with said sulfonating agent, the process comprising:

1) contacting the aqueous reaction mixture with sufficient amount of a substantially watersoluble alkanone containing 3-6 carbon atoms to cause the organic sulfonate within the mixture to precipitate,
2) permitting said alkane sulfonate within the resulting mixture to precipitate, and then
3) separating said alkane sulfonate from the aqueous mixture.

2. The process of claim 1 wherein the substantially watersoluble alkanone is acetone.

3. The process of claim 1 wherein acetone is recovered from the aqueous mixture and recycled to be contacted with the aqueous reaction mixture comprised of said alkane sulfonates.

4. The process of claim 1 wherein the unsaturated hydrocarbons are recovered from the mixture and recycled to be sulfonated.

5. The process of claim 1 wherein about 10 to about 10,000 percent by volume of the ketone is contacted per volume of the aqueous reaction mixture.

6. In a process for the production of alkane sulfonates from the reaction of bisulfite ion with unsaturated hydrocarbons containing about 6 to about 30 carbon atoms per molecule in the presence of a cosolvent containing water and an alkanol containing 1 to about 6 carbon atoms and in the presence of a free radical initiator, and wherein the reaction is permitted to come to substantial completion to produce alkane sulfonate, unreacted bisulfite, unreacted unsaturated hydrocarbons, water, alcohol, and by-products from the sulfonation reaction, the improvement comprising:

1) contacting the aqueous reaction mixture with sufficient amount of a substantially watersoluble alkanone containing 3-6 carbon atoms to cause said alkane sulfonate within the mixture to precipitate,
2) permitting said alkane sulfonate within the mixture to precipitate, then
3) separating said alkane sulfonate from the aqueous mixture.

7. The process of claim 6 wherein the alkanone is acetone.

8. The process of claim 6 wherein acetone is recovered from the mixture and recycled to be contacted with the aqueous reaction mixture.

9. The process of claim 6 wherein water, alkanol, unsaturated hydrocarbon, bisulfite, and unprecipitated alkane sulfonates remain in the aqueous mixture after the alkane sulfonates are precipitated and are recycled to the bisulfite sulfonation reaction.

10. The process of claim 6 wherein the alkanol is isopropyl alcohol.

11. The process of claim 6 wherein the unsaturated hydrocarbons are α-olefins containing about 10 to about 22 carbon atoms per molecule.

12. In a process for the production of alkane sulfonates from the reaction of sodium bisulfite with α-olefins containing about 10 to about 22 carbon atoms per molecule in the presence of a water-isopropyl alcohol cosolvent and in the presence of a free radical initiator, and wherein the reaction is permitted to come to substantial completion, the reaction mixture comprised of alkane sulfonate, unreacted sodium bisulfite, unreacted α-olefin, water, isopropyl alcohol, and sodium sulfate, the improvement comprising:

1. contacting the aqueous reaction mixture with sufficient amount of acetone to allow substantially all of the alkane sulfonate and sodium sulfate to precipitate from the reaction mixture,
2. permitting the alkane sulfonate and sodium sulfate within the mixture to precipitate due to the addition of the acetone, then
3. separating the precipitate from the aqueous mixture.

13. The process of claim 12 wherein the free radical initiator is air.

14. The process of claim 12 wherein the cosolvent is present in amounts of about 0.25 to about 10 volumes per volume of the α-olefin reactant.

15. The process of claim 12 wherein about 10 to about 10,000 percent by volume of the acetone is contacted per volume of the aqueous reaction mixture.

* * * * *